United States Patent
Soltis, Jr. et al.

(10) Patent No.: US 6,591,360 B1
(45) Date of Patent: Jul. 8, 2003

(54) LOCAL STALL/HAZARD DETECT IN SUPERSCALAR, PIPELINED MICROPROCESSOR

(75) Inventors: Donald C. Soltis, Jr., Fort Collins, CO (US); Rohit Bhatia, Fort Collins, CO (US); Mark Gibson, Loveland, CO (US)

(73) Assignee: Hewlett-Packard Development Company, Houston, TX (US)

( * ) Notice: Subject to any disclaimer, the term of this patent is extended or adjusted under 35 U.S.C. 154(b) by 0 days.

(21) Appl. No.: 09/484,138

(22) Filed: Jan. 18, 2000

(51) Int. Cl.$^7$ .............................. G06F 9/30; G06F 9/38; G06F 9/40
(52) U.S. Cl. .................. 712/219; 712/23; 712/245; 712/237
(58) Field of Search .............................. 712/219, 228, 712/217, 206, 210, 245, 244, 226, 43, 23, 243; 708/708

(56) References Cited

U.S. PATENT DOCUMENTS

| | | | |
|---|---|---|---|
| 5,394,351 A | * | 2/1995 | Widgen et al. ............. 708/706 |
| 5,859,999 A | | 1/1999 | Morris et al. ............... 395/565 |
| 5,860,017 A | | 1/1999 | Sharangpani et al. .. 395/800.23 |
| 6,038,658 A | | 3/2000 | Chow .......................... 712/219 |
| 6,279,100 B1 | | 8/2001 | Tremblay et al. ............. 712/24 |

FOREIGN PATENT DOCUMENTS

| | | |
|---|---|---|
| EP | 0992896 A1 | 4/2000 |
| GB | 2334122 | 8/1999 |
| GB | 2348526 A | 10/2000 |
| WO | WO 98/20414 | 5/1998 |

OTHER PUBLICATIONS

Wolfe, A., "Patents shed light on Merced's Innards", Electronic Engineering Times, Feb. 15, 1999.

* cited by examiner

*Primary Examiner*—Daniel H. Pan

(57) ABSTRACT

A method and apparatus that generates a simplified, localized version ("a local stall") of a global stall to improve the performance of a pipelined microprocessor. The local stall is generated when a data-dependency hazard is detected for a local consumer. Utilizing circuitry used in the pipelined microprocessor's data-forwarding circuitry, the local stall is generated with a relatively minor increase in circuitry. The local stall is generated much sooner than the global stall, arriving much sooner in a local pipeline. The local pipeline utilizes the local stall to override the global stall, when appropriate, and to ensure that correct data is read for a local consumer and to operate more efficiently than a standard pipeline without a local stall.

19 Claims, 11 Drawing Sheets

Figure 2 - Prior Art

| CYCLE | STANDARD PIPELINE REN REG EX1 EX2 WRB | | | | | LOCAL PIPELINE REN REC REG EX1 EX2 WRB | | | | | | localReg localEx1 stallEx1 |
|---|---|---|---|---|---|---|---|---|---|---|---|---|
| 0 | C | B | A | – | – | C | B | B | A | – | – | 0 0 0 |
| 1 | D | C | B | A | – | D | C | C | B | A | – | 1 0 0 |
| 2 MISMATCH | E | D | C | B | A | E | D | C | – | B | A | 0 1 1 |
| 3 RECOVERY | E | D | C | – | B | E | D | D | C | – | B | 0 0 0 |
| 4 | F | E | D | C | – | F | E | E | D | C | – | 0 0 0 |

FIGURE 7

| CYCLE | LOCAL PIPELINE<br>REN REG EX1 EX2 WRB | PIPELINE<br>REN REC REG EX1 EX2 WRB | localReg<br>localEx1<br>stallEx1 |
|---|---|---|---|
| 0 | C B A - - | C B A - - | 0 0 0 |
| 1 | D C B A - | B<br>D C B A - | 0 0 0 |
| 2 | E D C B A | C<br>E D C B A | 0 0 1 |
| 3 | E D C - B | D<br>E D C - B | 0 0 0 |
| 4 | F E D C - | D<br>F E D C - | 0 0 0 |
|   |   | E |   |

STANDARD

FIGURE 8

| CYCLE | STANDARD PIPELINE REN REG EX1 EX2 WRB | LOCAL PIPELINE REN REC REG EX1 EX2 WRB | localReg localEx1 stallEx1 |
|---|---|---|---|
| 0 | C B A - - | C B A - - - | 0 0 0 |
| 1 | D C B A - | B<br>D C B A - - | 1 0 0 |
|  |  | C |  |
| 2 MISMATCH | E D C B A | E C - B A -<br>D | 0 1 1 |
| 3 RECOVERY | E D C - B | E D C - B -<br>D | 0 0 1 |
| 4 | E D C - - | E D C - - -<br>D | 0 0 0 |
| 5 | F E D C - | F E D C - -<br>E | 0 0 0 |

FIGURE 9

LOCAL STALL/HAZARD DETECT IN SUPERSCALAR, PIPELINED MICROPROCESSOR

FIELD OF INVENTION

The invention relates to computers and superscalar, pipelined microprocessors. More particularly, this invention relates to the method and apparatus for improving the performance of pipelined microprocessors.

BACKGROUND OF THE INVENTION

Typical computer systems have a number of common components. These components, as seen in FIG. 1, include a CPU, a bus, memory, and peripheral devices. In high-speed computers, the CPU may be a superscalar, pipelined microprocessor. As shown in FIG. 2, a superscalar, pipelined microprocessor can include an instruction fetch unit, multiple pipelines, and a centralized data-dependency hazard detection mechanism. The instruction fetch unit fetches instructions and forwards them to a pipeline. In the pipeline, the instructions flow through multiple pipeline stages, after which the results of the instructions are committed to an architectural state (i.e., memory).

The stages in a standard pipelined microprocessor may include: a rename register identification or instruction decode stage ("REN"); a register reading or operand fetch stage ("REG"); a first instruction execution stage ("EX1"); a second instruction execution stage ("EX2"); and a write-back stage ("WRB"). A pipelined microprocessor performs parallel processing in which instructions are executed in an assembly-line fashion. Consecutive instructions are operated upon in sequence, but several instructions are initiated before a first instruction is complete. In this manner, instructions step through each stage of a particular pipeline, one instruction per stage per pipeline at a time. For example, a first instruction is fetched and then forwarded to the REN stage. When the first instruction is finished in the REN stage, i.e., it is decoded and the instruction's register identification ("RegID") is renamed from virtual to real space, it is forwarded to the REG stage and a second instruction is fetched and forwarded to the REN stage. This process continues until each instruction makes its way through every stage of the pipeline. However, in some situations, as discussed below, it is necessary to stall an instruction or multiple instructions in the pipeline. Stalling an instruction involves holding the instruction in a stage of the pipeline until the situation is resolved and the stall is no longer asserted.

Instructions in pipelined microprocessors are producers and consumers. In a pipelined microprocessor, one instruction in an earlier stage (e.g., REG) may be dependent (a consumer) on data from an instruction (producer) in a later stage (e.g., EX1 or EX2). A producer is an instruction generating data, such as an add instruction. A target register is where the producer is going to write the results (destination operands) of the add. There may be a following add instruction which is earlier in the pipeline—earlier means it is a younger instruction in program order' that takes the results of the first add instruction from the target register (its source register) and adds it to something else, creating a second result. Therefore, the second add instruction is a consumer, and the relationship between the consumer and the producer is called a data-dependency. The process of the consumer reading data from its source register is known as consumer operand generation.

Often times it takes an instruction multiple stages or cycles before it completes its operation and the data generated by the instruction is available. This delay or latency can vary from instruction to instruction, with simple instructions taking one stage (one-cycle latency) and complex instructions taking multiple stages (multiple-cycle latency). If a producer has multiple-cycle latency, then its data will not be available to the consumer until the producer moves to a later stage and completes its operation. Such a situation is called a data-dependency hazard, and if a code segment is written with the consumer immediately following the producer or otherwise not separated by enough pipeline stages from the producer, the hardware has to detect the data-dependency hazard. In this situation, the hardware must stall the consumer in some pipeline stage until the producer can make its data available.

As illustrated in FIG. 2, conventional superscalar pipelined designs have a centralized data-dependency hazard detection mechanism whose output is a stall signal. This stall signal is a global stall that effectively holds the consumer in the EX1 stage, the stage where the consumer is waiting for its source operands because the global stall does not issue until the consumer has moved from the REG stage. The global stall applies to all pipelines and all stages prior to and including the stage in which the data-dependency hazard is detected. The centralized data-dependency hazard detection circuitry detects all possible consumer-producer data-dependency hazards. The global stall signal that is generated must traverse earlier pipeline stages—to stall something in the REG stage, the stall must traverse any prior stages, such as the REN stage. Likewise, the global stall signal must traverse the physical dimensions of the CPU to move back across stages. The distance alone across the die of a CPU can be relatively long, and there are usually a large number of stages.

Accordingly, arrival of the global stall signal at any one point may be late in a cycle, giving late notice of a stall. The resulting late notice increases when additional pipelines are added because it takes a non-linear increase in the amount of logic to generate the global stall as the number of pipelines is increased. This non-linear calculation is a function of the number of source operands by the width or number of pipelines by the depth of the pipelines (or number of stages). Consequently, faster circuitry is required with the global stall in order to operate at intended frequencies. This circuitry can limit the entire CPU frequency of operation.

SUMMARY OF THE INVENTION

The present invention is a method and apparatus that generates a localized and simplified version of the global stall ("a local stall") and uses the local stall to improve the operation of a pipelined microprocessor. The invention locates simplified data-dependency hazard detection nearer to the consumer operand generation than the centralized data-dependency hazard detection, thereby overcoming the inherent problems in centralized data-dependency hazard detection discussed above. The simplified data-dependency hazard detection reuses existing circuitry from a data forwarding architecture to generate a local stall. The data forwarding architecture performs calculations necessary to forward the data generated by producer instructions to consumer instructions. Accordingly, the simplified data-dependency hazard detection can generate a local stall with a very limited increase of logic by re-using data forwarding circuitry.

In an embodiment, the simplified data-dependency hazard detection performs operations on a local consumer re-using comparators used in the data forwarding calculations. These comparators compare pipeline producer RegIDs with the local consumer RegID to detect data dependencies. The producer RegIDs are the register addresses or identifiers for the target or destination register to which the producer is going to write. Likewise, the consumer RegID is the register address or identifier of the source register from which the consumer is going to read. If a producer destination register and the consumer source register match, there is a data-dependency between the producer and the consumer.

After determining that the consumer is data-dependent on a producer(s) (the "matched producer(s)"), the apparatus of the present invention evaluates the matched producer(s) to determine if their data is available yet. If the matched producer(s)' data is not available, then there is a data-dependency hazard and a local stall will be generated.

The simplified data-dependency hazard detection need only be concerned about its consumer across all producers. Specifically, the simplified data-dependency hazard detection need only evaluate the local stall on a per source operand basis, further reducing the logic required. Since the global stall is concerned with all producers and all consumers, the local stall is a simplified version or subset of the global stall. Further, whereas the global stall calculation is a function of the number of pipelines executing in parallel and the number of stages in each pipeline, the operand based local stall calculation is directly proportional to the number of pipelines multiplied by the number of stages data is made available. Consequently, the local stall can be generated much sooner than the global stall.

If a consumer's local stall does not evaluate to true, then the source operands for that consumer are correct and no further operand manipulation is required. This is true regardless of the global stall that is asserted one cycle later. However, if the local stall does evaluate to true, then that consumer's operand is updated once the data becomes available. Since the global stall is a super-set of all local stalls and other data-dependency conditions that the local stalls are not concerned with, it is a forbidden state to have the local stall in EX1 evaluate to true and the global stall in EX1 evaluate to false. Furthermore, it is important to note that the local stall does not traverse additional stages or across the CPU chip die as the global stall must. Rather, the local stall is generated and asserted locally, arriving much sooner than the global stall.

BRIEF DESCRIPTION OF THE FIGURES

FIG. 7 is a chart illustrating the operation of the superscalar, pipelined microprocessor according to the present invention.

FIG. 8 is a second chart illustrating the operation of the superscalar, pipelined microprocessor according to the present invention.

FIG. 9 is a third chart illustrating the operation of the superscalar, pipelined microprocessor according to the present invention.

DETAILED DESCRIPTION OF THE INVENTION

The invention is a method and apparatus for generating a local stall that is used in conjunction with the global stall to reduce the timing pressure on consumer operand generation. The local stall is a simplified version of the global stall and can be generated much sooner than the global stall. The invention locates simplified data-dependency hazard detection—which reuses circuitry involved in data forwarding calculations—nearer the consumer operand generation. The invention is best understood by first explaining how the local stall is generated by the simplified data-dependency hazard detection and then showing how the local stall is used to improve pipeline performance. In the description below, the pipeline stages discussed are REN, REG, EX1, EX2, and WRB, although the invention may be used with any variety of pipeline stages and combinations of pipeline stages.

Figure 1:
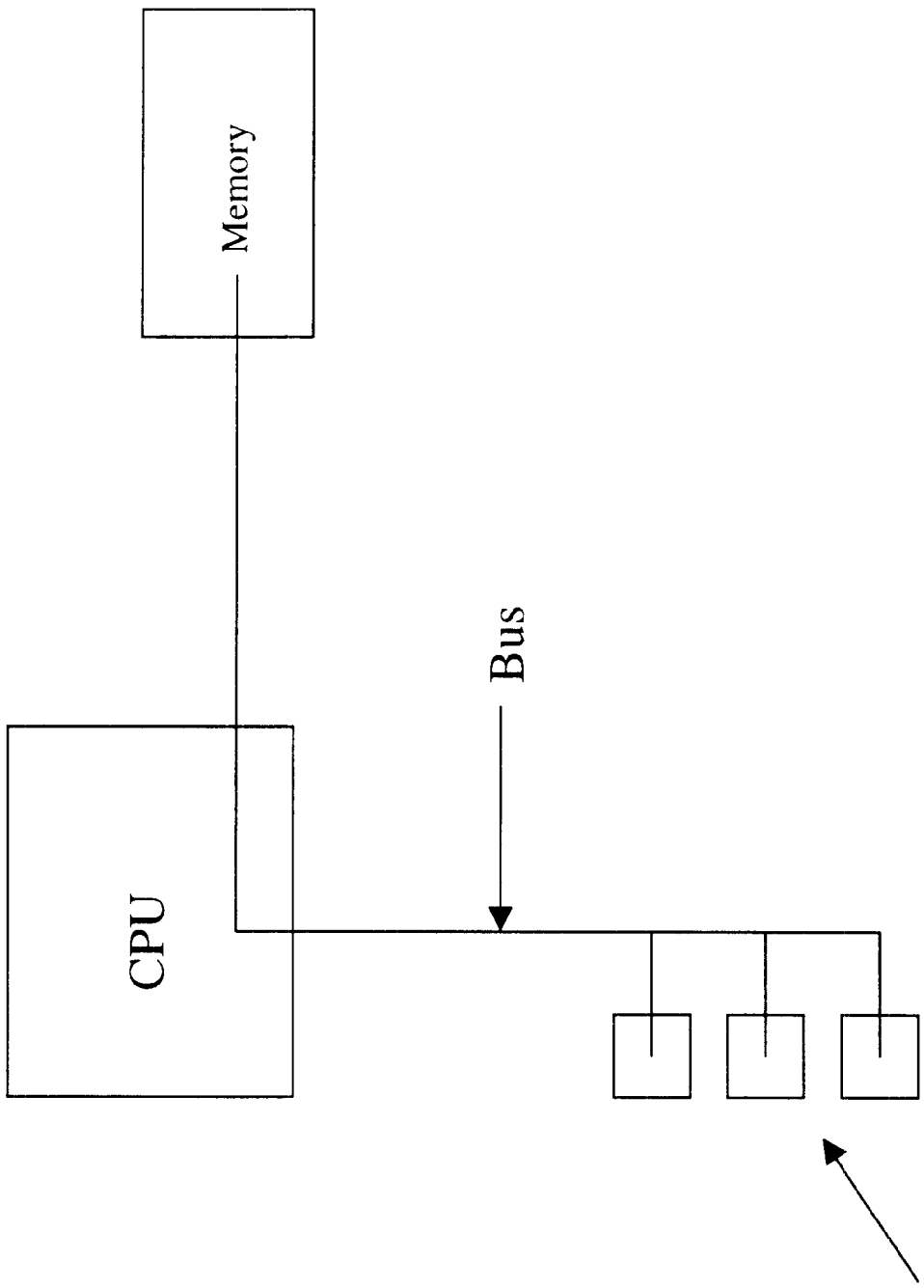
FIG. 1 is a block diagram of a computer system.
Figure 2:
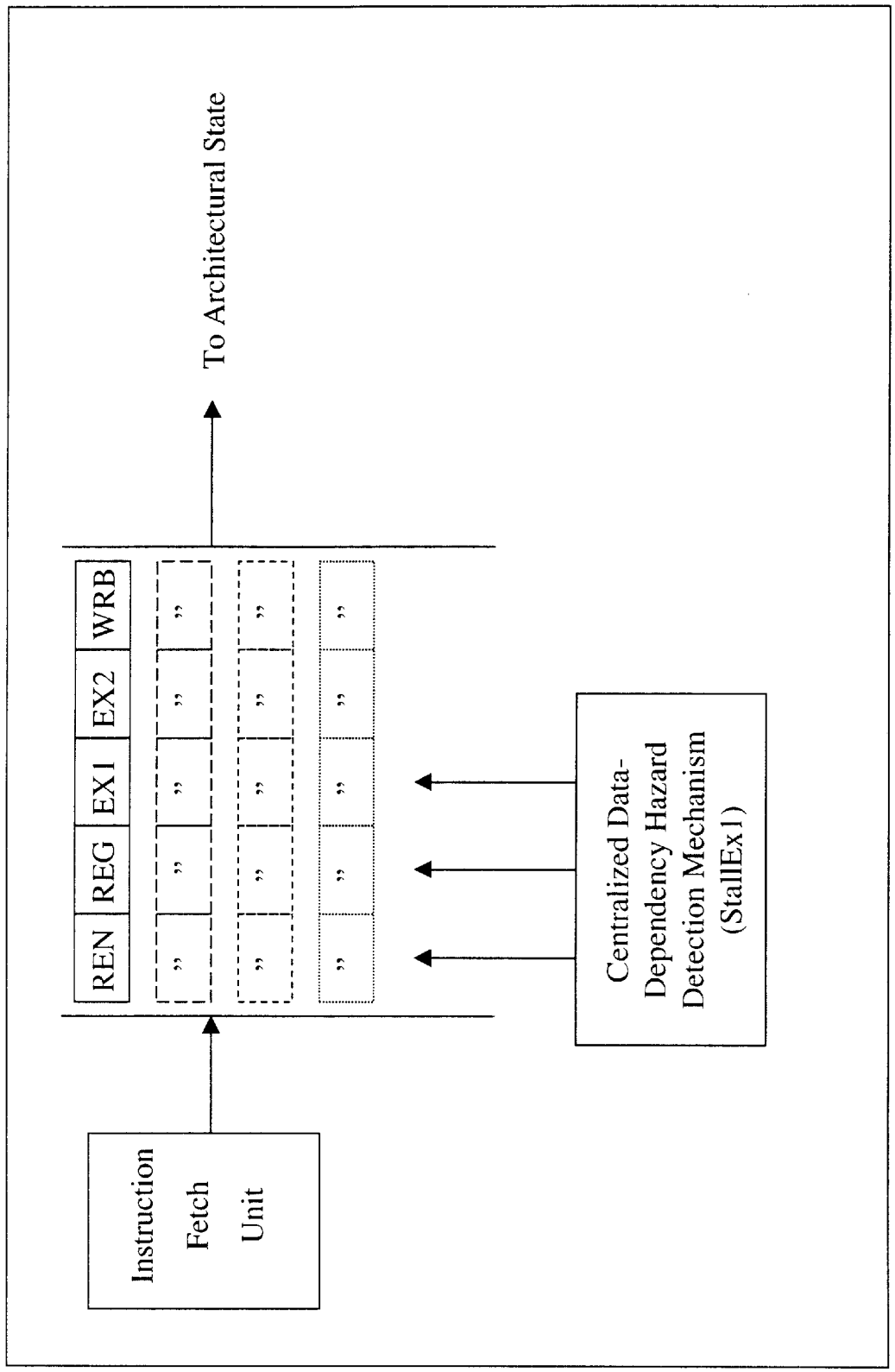
FIG. 2 is a block diagram of a prior art superscalar, pipelined microprocessor.
Figure 3:
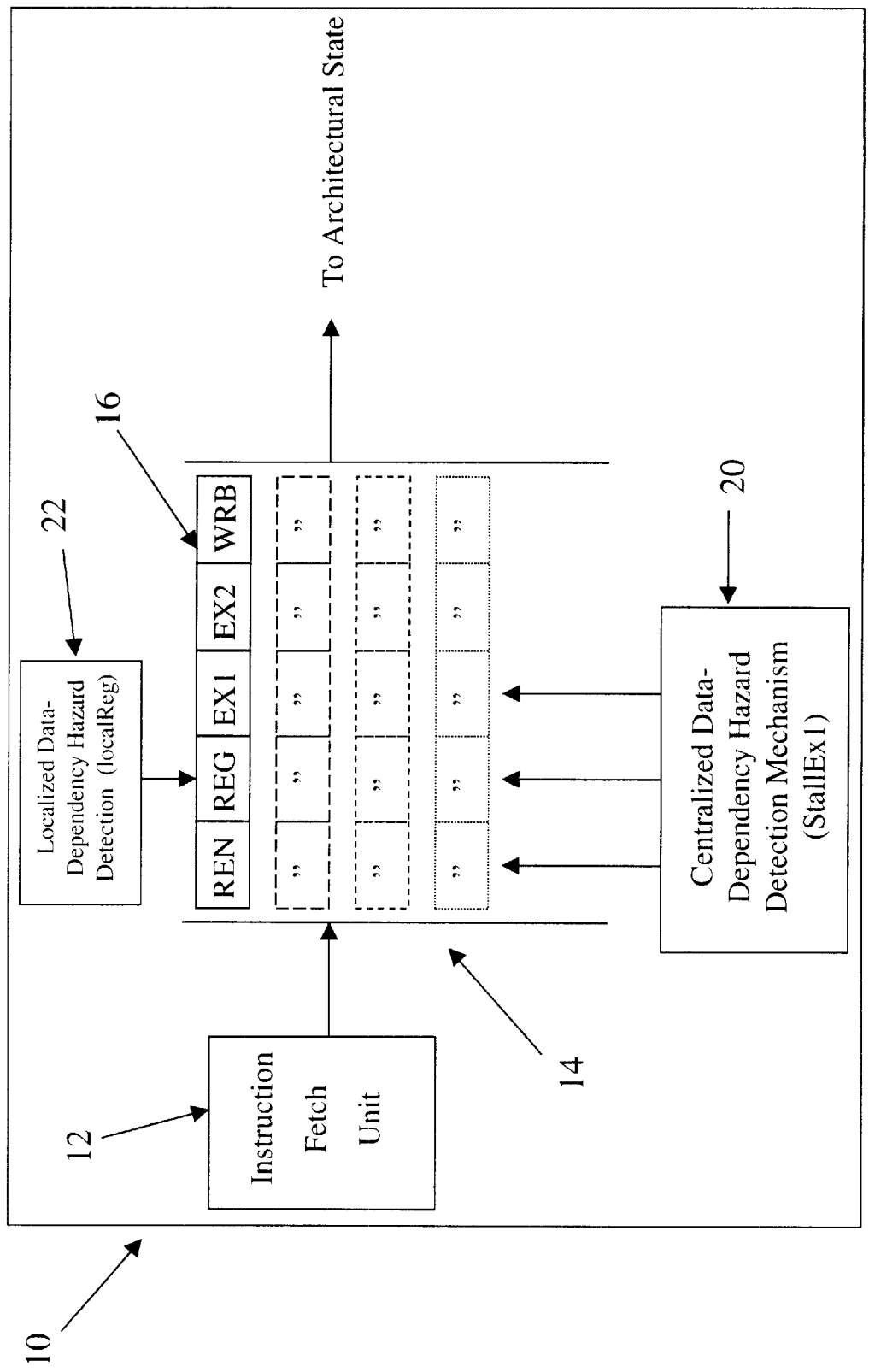
FIG. 3 is a block diagram of a superscalar, pipelined microprocessor with a simplified data-dependency hazard detection.

FIG. 3 illustrates a superscalar pipelined microprocessor 10 according to the present invention. Like the microprocessor shown in FIG. 2, the superscalar pipelined microprocessor 10 includes: an instruction fetch unit 12; multiple pipelines 14, which include a local pipeline 16; and a centralized data-dependency hazard detection mechanism 20. The superscalar pipelined microprocessor 10 also includes a local or simplified data-dependency hazard detection 22 associated with the local pipeline 16. The simplified data-dependency hazard detection 22 generates a local stall on a per operand basis applying to one stage of the local pipeline 16.

Figure 4:
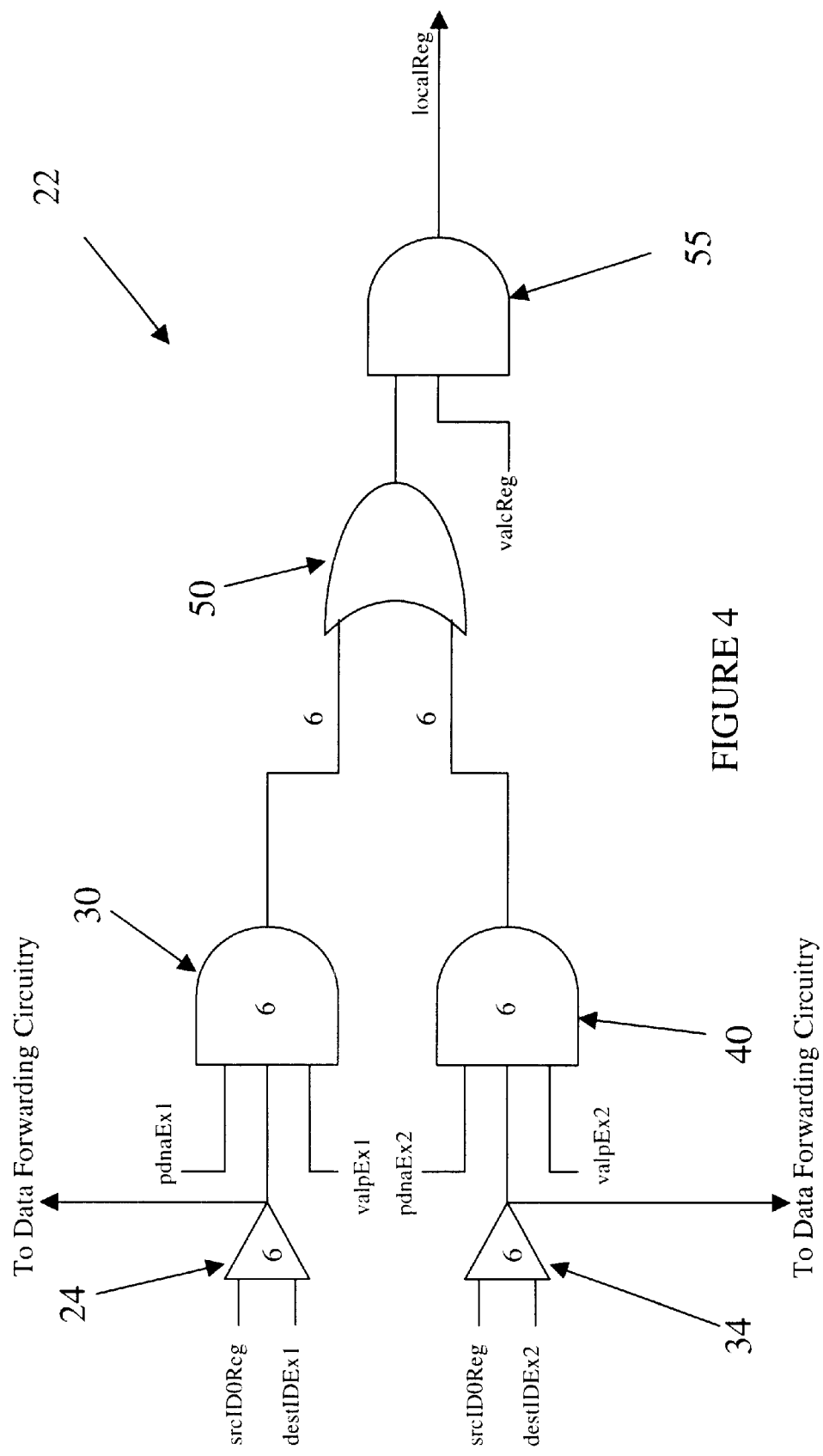
FIG. 4 is a logic circuit diagram of the simplified data-dependency hazard detection.

FIG. 4 shows the simplified data-dependency hazard detection 22 in greater detail. The simplified data-dependency hazard detection 22 generates the local stall, symbolized by localReg, for the REG stage of the local pipeline 16 by performing operand-specific calculations. The simplified data-dependency hazard detection 22 can be modified to generate the local stall on a pipeline or multiple-stage basis. So modified, the simplified data-dependency hazard detection 22 would perform multiple-operand calculations to generate the local stall.

The simplified hazard detection 22 uses outputs from comparators 24, 34 to perform the operand calculations. These comparators 24, 34 are part of the data-forwarding architecture already present in the superscalar pipelined microprocessor 10. This is indicated by the output from the comparators 24, 34 "to data-forwarding architecture."

A first comparator 24 has as its inputs a source operand RegID in the REG stage and a destination operand RegID in the EX1 stage. As seen in FIG. 4, these two inputs are srcID0Reg and destIDEx1, respectively. SrcID0Reg identifies the source register for a consumer instruction in the REG stage of the local pipeline 16 and destIDEx1 identifies the destination register for producer instructions in the EX1 stage in multiple pipelines.

In the example shown, there are six (6) execution pipelines and, therefore, a total of six producers in the EX1 stage of these six pipelines. The "6" on the first comparator 24 indicates that the first comparator 24 has six wires coming out of it, one wire for each producer in each EX1 stage of each pipeline. Accordingly, the first comparator 24 performs six comparisons between srcID0Reg and destIDEx1, to find a data-dependency between one operand of one of the consumer instructions in REG and one of the six producer instructions in EX1. If the source register is the same as the destination register for one of the six producers, i.e., srcID0Reg and destIDEx1 match for one of the producers, then there is a data-dependency and the producer is a matched producer. As a result, the first comparator 24 asserts an output on the wire for the producer in EX1 on which the consumer in REG is data-dependent (i.e, the matched producer).

The outputs of the first comparator 24 are input into a first AND gate 30. The first AND gate 30 has two additional inputs. The other two inputs of the first AND gate 30 are a valid producer in EX1 signal, represented by valpEx1, and a producer data not available signal, represented pdnaEx1. An asserted valpEx1 signal signifies that the matched producer in EX1 is valid and that a stall should be generated if the other inputs of the first AND gate 30 are also asserted (i.e., there is a data-dependency and a hazard). If the matched producer in EX1 is not valid (valpEx1 is not asserted), then a stall will not be generated based on the data-dependency on that matched producer in EX1.

Figure 5:
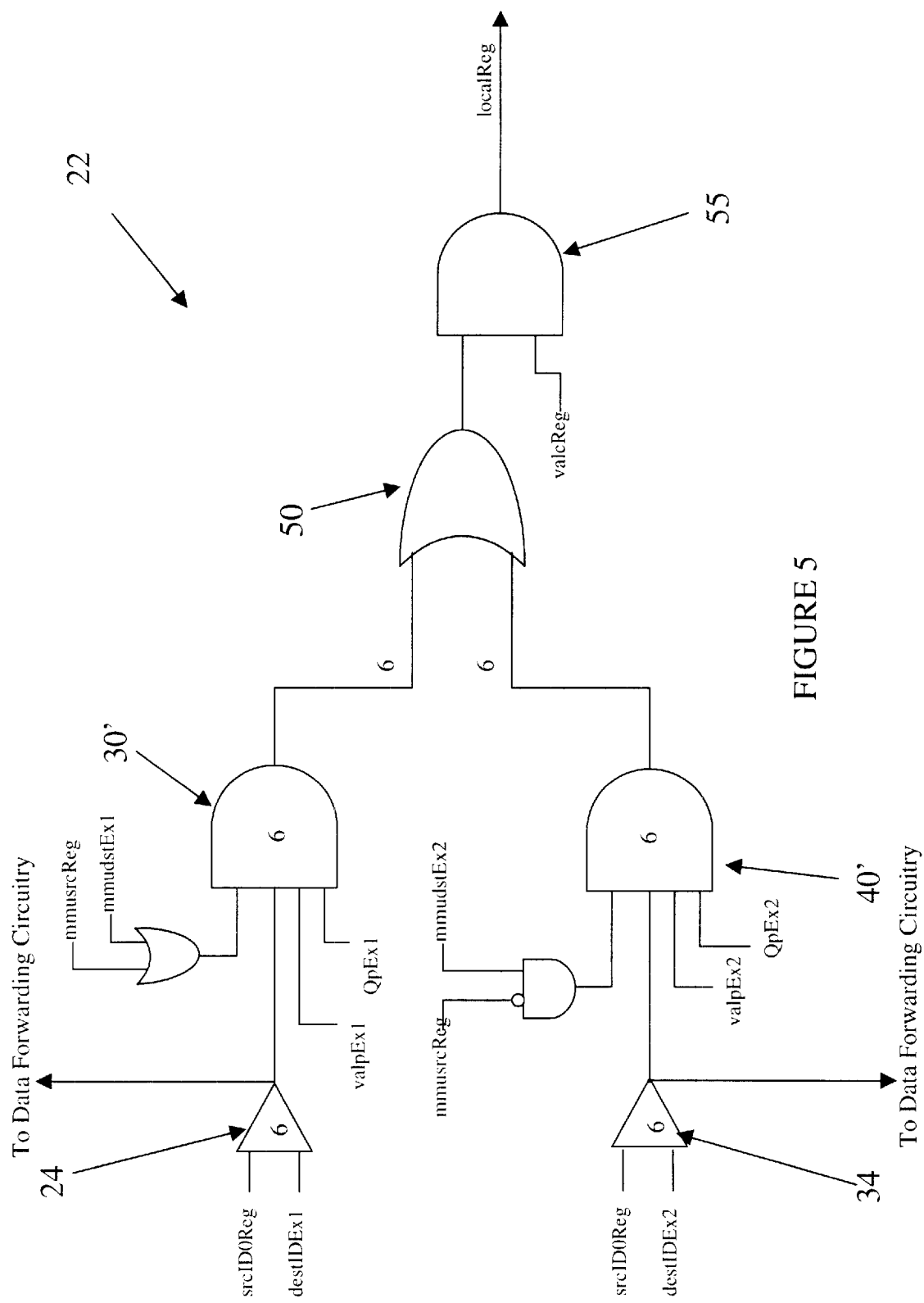
FIG. 5 is a logic circuit diagram of an alternative simplified data-dependency hazard detection.

In an alternative embodiment shown in FIG. 5, there may also be an additional input to the first AND gate 30'. This input is QpEx1, which is a qualifying predicate for the matched producer in EX1. If the qualifying predicate is asserted, then the matched producer in EX1 will be normally executed. If the qualifying predicate is not asserted, then the matched producer in EX1 will not be executed and the matched producer will not produce data. If the qualifying predicate for a matched producer in EX1 is not asserted, then there will be no local stall generated on the matched producer's account (since the first AND gate 30' output will be not asserted). Accordingly, the qualifying predicate is an alternative way of signifying whether it is necessary to generate a local stall for a given matched producer.

The producer data not available signal, or pdnaEx1, indicates whether there is a data-dependency hazard for the matched producer. The pdnaEx1 signal characterizes the matched producer with the producer type or the attributes of the producer. Alternatively, pdnaEx1 characterizes the relationship of the matched producer with the attributes of the consumer. If the data is not available from the matched producer, then there is a data-dependency hazard for the consumer.

Certain producer instructions have different latencies, such as taking one cycle or more to compute. Depending on the cycle, an instruction with multiple-cycle latency may not be available, while an instruction with single-cycle latency will be available. Accordingly, the characterization determines the latency of the producer in the EX1. If the latency and the current cycle are such that the instruction is not yet calculated, then the matched producer data is not available and the pdnaEx1 is asserted. If pdnaEx1 is asserted and the other two inputs in the first AND gate 30 are also asserted for the matched producer, then there is a data-dependency hazard in the EX1 stage.

The generation of the pdnaEx1 signal is implementation specific. For example, if the matched producer in EX1 has a 2-cycle latency, then pdnaEx1 will be asserted when the matched producer is in EX1, but, a pdnaEx2 signal will not be asserted when the matched producer is in EX2 (see below). If the matched producer has a 3-cycle latency, then pdnaEx1 will be asserted when the matched producer is in EX1, and the pdnaEx2 signal will be asserted when the matched producer is in EX2 (see below). Likewise, if the matched producer has a 4-cycle latency, then pdnaEx1 will be asserted when the matched producer is in EX1, pdnaEx2 will be asserted when the matched producer is in EX2, and a pdnaWrb signal will be asserted when the matched producer is in WRB (see below).

As a specific example, some implementations involve multi-media ("mmu") instructions, as seen in FIG. 5. The pdnaEx1 signal is generated by ORing together two signals, mmusrcReg and mmudstEx1, with an OR gate 32. The mmusrcReg signal is asserted if the consumer is a mmu-type instruction in REG, i.e., there is a mmu consumer. The mmudstEx1 is asserted if the matched producer is a mmu-type instruction in EX1, i.e., there is a mmu producer. The mmu-type producer instruction has a 2-cycle latency to another mmu-type consumer instruction. Therefore, if the matched producer is a mmu producer in the EX1, there will be a data-dependency hazard since a consumer in REG is only one stage behind the EX1 stage. As a result, a local stall will be generated if the other two inputs in the first AND gate 30 are also asserted for the matched producer.

For the EX2 portion of the simplified hazard detection 22 in FIG. 5, the calculation of pdnaEx2 is different. The pdnaEx2 signal is generated by ANDing together a NOT mmusrcReg and mmudstEX2. As stated above, a mmu-type producer instruction has a 2-cycle latency to another mmu-type consumer instruction. However, when the mmu-type producer instruction has moved to EX2, the 2-cycle latency for a mmu-type consumer instruction in REG has been satisfied. Consequently, pdnaEx2 will not be asserted if there is a mmu-type consumer instruction in REG (NOT mmusrcReg is not asserted). If the consumer instruction in REG is not an mmu-type instruction, i.e., NOT mmusrcReg is asserted, the mmu-type producer instruction will have a 3-cycle latency. Accordingly, there will be a data-dependency hazard for the source operand in REG and pdnaEx2 will be asserted.

Returning to FIG. 4, a second comparator 34 has as its inputs source operand in REG and destination operand in EX2, srcID0Reg and destIDEx2, respectively. Like the first comparator 24 described above, the second comparator 34 compares the srcID0Reg against destIDEx2 for six (6) possible producers in the EX2 stage. If a data-dependency is found, the second comparator 34 asserts an output on the wire for the matched producer in EX2 to a second AND gate 40.

The second AND gate 40 includes a producer data not available input, the pdnaEx2 signal mentioned above. The pdnaEx2 signal performs the same function as pdnaEx1 for the first AND gate 30, only pdnaEx2 is concerned with the matched producer in EX2. Accordingly, if producer data is not available for the matched producer in EX2, pdnaEx2 will be asserted. In this situation, both inputs to the second AND gate 40 will be asserted. Consequently, the second AND gate 40 output will be asserted, indicating a data-dependency hazard in EX2 for that producer.

The outputs of the first AND gate 30 and the second AND gate 40 are the results of the operand calculations described above. These outputs are ORed together by the OR gate 50. Since there are six pipelines, and hence, six producers for this example, the OR gate 50 performs an OR function on the outputs of the first AND gate 30 and the second AND gate 40 for each producer. Therefore, if the results of the operand calculations show that there is a data-dependency hazard for any one of the six producers in either the EX1 stage or the EX2 stage, the output of the OR gate 50 will be asserted. An asserted OR gate 50 output indicates that a local stall should be generated for the consumer in REG.

Before generating a local stall and asserting localReg based on the asserted OR gate 50 output, the simplified data-dependency hazard detection 22 performs one more operation. The OR gate 50 output is ANDed with a valid consumer in REG signal valcReg, by AND gate 55. If the consumer in REG is not valid, the valcReg signal is not asserted, and a local stall will not be generated for that consumer. If the consumer in REG is valid, however, valcReg will be asserted and a local stall will be generated for that local consumer; i.e., localReg will be asserted.

Figure 6:
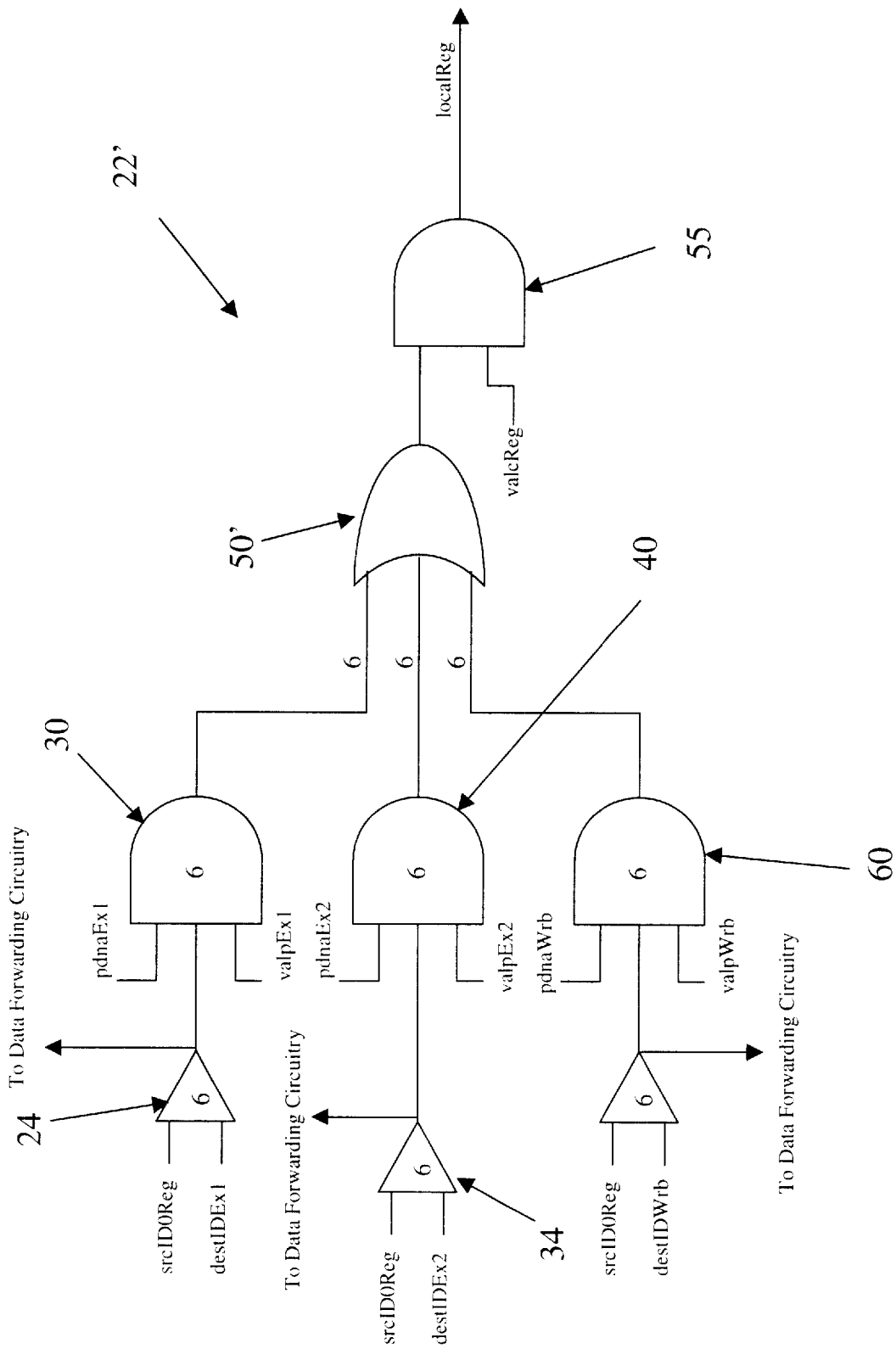
FIG. 6 is a logic circuit diagram of an another simplified data-dependency hazard detection.

FIG. 6 illustrates an alternative simplified hazard detection 22'. In this embodiment, there are three inputs into the OR gate 50'. The third input is from a third AND 60, which evaluates the matched producers in the write-back stage WRB of the six pipelines. Producers in the WRB stage, upon which the consumer in REG is data-dependent, can cause a stall if they are 4-cycle latency instructions. The signal pdnaWrb mentioned above will be asserted if a 4-cycle latency producer in WRB matches with the consumer in REG (i.e., the consumer in REG is data-dependent on the producer in WRB). Otherwise, the inputs for the third AND 60 are generated in a manner similar to the inputs for the first AND gate 30 and second AND gate 40 described above.

As discussed above, FIGS. 4, 5, and 6 all show a circuit for generating a local stall based on a data-dependency hazard for one operand of one consumer instruction in REG. A given instruction can have multiple operands. Accordingly, the circuits shown in FIGS. 4, 5, and 6 are repeated for each operand of each consumer instruction in each pipeline. For example, with the six (6) pipelines discussed above, there would be at least six (6) consumer instructions with typically two (2) source operands per consumer for a total of twelve (12) source operands. Consequently, there would be twelve (12) of the circuits shown in FIGS. 4, 5, and 6 for these six (6) pipelines. Alternatively, these circuits can be modified to generate a local stall based on multiple operand calculations. Such a modification would entail utilizing the outputs from data-forwarding comparators for a second source operand in REG and the producer in a later stage (EX1, EX2, WRB). This output would be input into the AND gates (AND 30, AND 40, AND 60) seen in these Figures. The circuits would otherwise behave as described above.

A method utilizing the local stall to improve pipeline performance is illustrated by FIG. 7. FIG. 7 is a chart illustrating the operation of a superscalar pipeline microprocessor 10 according to the present invention. It shows instructions in the various stages of a standard pipeline (which represents other pipelines in the superscalar pipelined microprocessor 10 without a simplified data-dependency hazard detection 22) and the local pipeline 16 through five clock cycles (0–4). The stages include REN, REG, EX1, EX2 and WRB in both the standard pipeline and the local pipeline 16. Additionally, the local pipeline 16 is a standard pipeline modified according to the present invention to include a recovery latch REC.

The chart also shows the values of localReg, localEx1, and stallEx1. As described above, localReg is the local stall in the REG stage. LocalEx1 is the local stall in the EX1 stage—this is accomplished, for example, by passing localReg through a staging latch (not shown) which then outputs the local stall in the EX1 stage along with whatever instruction is in EX1. StallEx1 is the centralized or global stall.

In cycle 0, instructions C, B, and A are in the REN, REG, and EX1 stages, respectively, of the standard pipeline and local pipeline 16. As is discussed in greater detail below, the REC latch in the local pipeline 16 is in parallel with the REG stage. The REC latch is not an additional stage. Accordingly, in cycle 0, the REC latch contains the same instruction as the REG stage, instruction B. In cycle 0, localReg, localEx1, and stallEx1 are all not asserted; i.e., there is no local or central stall.

In cycle 1 the instructions are all forwarded one stage and a new instruction D is fetched into the REN stage of the standard pipeline and local pipeline 16. The REC latch in the local pipeline 16 again contains the same instruction as the REG stage, instruction C. In cycle 1, however, localReg is asserted, while localEx1 and stallEx1 are still not asserted. Therefore, a local data-dependency hazard has been detected and a local stall asserted by the simplified data-dependency hazard detection 22, as described above, but the central stall is not yet asserted. Since instruction C is in the REG stage when the local stall is asserted, it is known that there is a data-dependency between instruction C and one of the later two instructions, instruction B or instruction A. The local stall signifies that the data for the consumer instruction C is not available yet from the matched producer instruction in a later stage (for example, instruction A).

In cycle 2, known as the mismatch cycle, the effects of the local stall in the REG stage are seen. The instructions are all forwarded one stage in the standard pipeline, and a new instruction E is fetched into both pipelines in the REN stage. Due to the local stall asserted in cycle 1, however, only instructions A and B are forwarded in the local pipeline 16. This mismatch between the standard pipeline and the local pipeline 16 illustrates the effect and advantages of the local stall. Since the local pipeline 16 is alerted to the local data-dependency hazard for the consumer in REG (instruction C) and a matched producer (for example, instruction A), the local pipeline 16 knows that the data read by the consumer from its source register during cycle 1 is not correct. Since the local stall is asserted in cycle 1 while the consumer is still in REG, the local pipeline 16 can hold the consumer in REG to allow the producer to finish its operation. Accordingly, instruction C is held in the REG stage in cycle 2, during which the matched producer (for example, instruction A) finishes its operation.

Since instruction C is held in the REG stage, and instruction B has moved forward to the EX2 stage, EX1 is empty. Likewise, since instruction C is still in the REG stage in the local pipeline, whereas it normally would be in EX1 (e.g., see the standard pipeline), instruction D is retained in the REC latch. Instruction D is retained in the REC latch, which is in parallel to the REG stage, so that it is not lost when instruction C is held in the REG stage. LocalReg is now not asserted, indicating that there is no more local data-dependency hazards for the consumer in the REG stage (instruction C) and that the matched producer for instruction C has a 3-cycle latency (hence, a 1-cycle stall because of the one stage separation of consumer instruction C, and in this example, matched producer instruction A). LocalEx1 is asserted since the local stall has moved from REG to EX1. Likewise, stallEx1 is now asserted, reflecting the global stall generated as a result of the local data-dependency hazard detected and asserted by the simplified data-dependency hazard detection 22 in cycle 1. That the global stall is not asserted until cycle 2 illustrates the delay involved in generating a global stall and underlines the advantages of generating a local stall.

In cycle 3, known as the recovery cycle, all of the instructions in the stages preceding and including EX1 remain stationery in the standard pipeline, due to the global stall (stallEx1) asserted in EX1 in cycle 2. Since the global stall is asserted in EX1, the instructions in the later stages EX2 and WRB are unaffected and are forwarded to the EX2 stage and out of the standard pipeline. When instruction A is forwarded out of the standard pipeline, it is committed to architectural state.

In the local pipeline 16, however, the global stall is overrode by localEx1 and instructions C and D are forwarded to the EX1 and REG stages from the REG stage and the REC latch, respectively. Instructions C and D recover from the local stall asserted in cycle 1 and are forwarded to the following stages. Ordinarily, this recovery would be a violation of normal pipeline rules since the instructions C and D are forwarded after a global stall is asserted, in affect overriding the global stall. However, due to the local stall asserted in cycle 1 and the lack of a local stall in cycle 2, the data read by instruction C from its source register is now known to be collect. Consequently, instruction C can be forwarded to the next stage, EX1, without harm. The forwarding of instructions C and D, along with the forwarding of instructions B and A, which are unaffected by the global stall stallEx1, brings the local pipeline 16 into agreement with the standard pipeline again.

In cycle 4, the standard pipeline and local pipeline 16 behave normally and equivalently, since there are no local or global stalls asserted. Instruction B is forwarded out of both pipelines, instructions C, D, and E are each forwarded one stage, and new instruction F is fetched into the REN stage of both pipelines. Instruction E is also in the REC latch in the local pipeline 16.

FIG. 8 illustrates pipeline performance without a local stall. In the first two cycles, both pipelines behave as above in FIG. 7. In cycle 2 the instructions in both pipelines are forwarded one stage, since there is no local stall asserted. Since there is no local stall asserted, there is no local data-dependency hazard, and the data read by instruction C from its source register is known to be correct. A global stall stallEX1 is asserted in cycle 2. Accordingly, the instructions in both pipelines in the stages preceding and including EX1 remain stationary in cycle 3 (as above, the instructions in the EX2 and WRB stages are forwarded). Since there was no local stall asserted in cycle 1, the local pipeline 16 obeys the global stall generated in cycle 2. Since there is no stall (local or centralized) asserted in cycle 3, normal pipeline function resumes in both pipelines in cycle 4, as in FIG. 7.

A method utilizing the local stall to improve pipeline performance when two global stalls are asserted is illustrated by FIG. 9. The pipeline performance for cycles 0, 1, 2, and 3 are identical to the pipeline performance for cycles 0, 1, 2, and 3 in FIG. 7, as described above. As in FIG. 7, instruction C is held in the REG stage during the mismatch cycle and the local pipeline 16 again disobeys the global stall asserted in cycle 2 and forwards instructions C and D in the recovery cycle. A second global stall, however, is asserted in cycle 3 and the instructions in both the standard pipeline and local pipeline 16 remain stationary in the stages preceding and including EX1 during cycle 4. Since there was no local stall asserted in cycle 2, the local pipeline 16 obeys the second global stall. Not until cycle 5 do normal pipeline functions resume in both pipelines.

Figure 10:
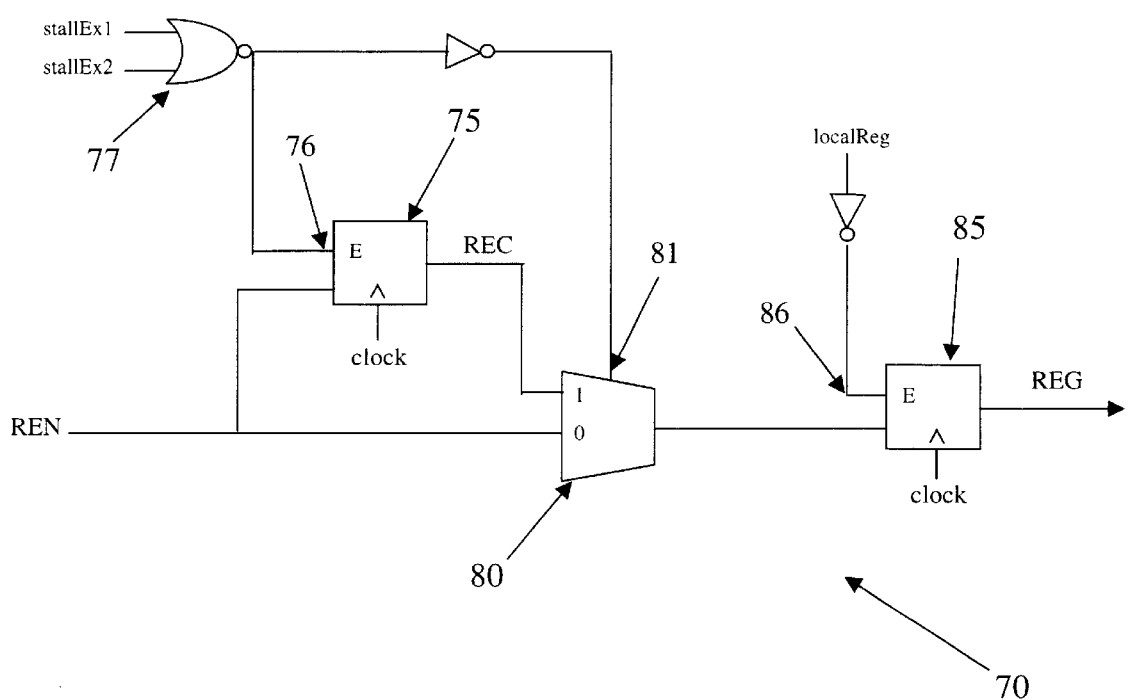
FIG. 10 is a logic circuit diagram of a first portion of a local pipeline.

FIG. 10 illustrates a first portion 70 of the local pipeline 16 that performs according to the method described above, with reference to FIGS. 7–9. The first portion 70 of the local pipeline 16 shows the REN stage to REG stage portion of the local pipeline 16. The first portion 70 of the local pipeline 16 comprises three main components associated with the REN and REG stages: a first enable latch 75, a multiplexer 80, and a second enable latch 85. The first enable latch 75, multiplexer 80, and second enable latch 85 all have a clock input and additional inputs. The instruction in the REN stage is output to both the first enable latch 75 and the multiplexer 80, while the instruction in the second enable latch 85 is output to the REG stage.

As described above, the first enable latch 75 (the REC latch) is in parallel with the REG stage, since they both receive the output of the REN stage. The first enable latch 75 (REC) has an enabling input 76 that when asserted causes the first enable latch 75 (REC) to update with the instruction in REN. When the enabling input 76 is not asserted, the first enable latch 75 (REC) holds its present instruction. When holding its present instruction, the first enable latch 75 (REC) output to the multiplexer 80 is this held instruction.

The enabling input 76 for the first enable latch 75 is from a NOR gate 77 of stallEx1 and stallEx2. StallEx1 is the global or centralized stall described above and seen in FIGS. 7–9. StallEx2 is a second global or centralized stall from a different unit. The stallEx2 prevents instructions from writing back because exceptions are not yet determined. Exceptions are data overruns or errors, and are also known as faults. The write back stage WRB cannot commit the results of an instruction to the architectural state in the presence of an exception. Therefore, stallEx2 is asserted when an excepting instruction is detected in EX2 and until the exceptions are determined and resolved. With six pipelines, there are six instructions in EX2, any of which can have exceptions. The stallEx2 will prevent the excepting instruction and any younger instructions in EX2 from committing to architectural state.

Since the enabling input 76 is a NOR, if either stallEx1 or stallEx2 are asserted, then the enabling input 76 will not be asserted and the first enable latch 75 (REC) will hold its present instruction. Referring to FIG. 7, we see that this is the situation in cycle 2. StallEx1 is asserted in cycle 2, so REC holds instruction D and does not update with instruction E (which is in REN) in cycle 3. If both stallEx1 and stallEx2 are not asserted, the enabling input 76 will be asserted and the first enable latch 75 (REC) will update with the instruction from REN (as seen in cycles 1 and 4 of FIG. 7).

The multiplexer 80 receives an input from REN, an input from the first enable latch 75, and a control input 81. The "1" and "0" on the multiplexer 80 indicate that the multiplexer 80 will output the input corresponding to the "1" when its control input 81 is asserted and that it will output the input corresponding to the "0" when its control input 81 is not asserted.

The control input 81 for the multiplexer 80 is a NOT of the output of the NOR gate 77 of stallEx1 and stallEx2. In other words, the control input 81 is the NOT of the enabling input 76. If the enabling input 76 is not asserted, i.e., stallEx1 and/or stalEx2 are asserted, then the control input 81 for the multiplexer 80 will be asserted. Consequently, the multiplexer 80 will output the input from the first enable latch 75. If the enabling input 76 is asserted, i.e. stallEx1 and stallEx2 are not asserted, the control input 81 will be not be asserted, and the multiplexer will output the input from REN.

As an example, see FIG. 7. In cycle 2, stallEx1 is asserted, so the control input 81 is asserted. Accordingly, in cycle 3 the multiplexer 80 outputs instruction D (which is the input from REC), which is in turn output to REG by the second enable latch 85, as is discussed below.

The second enable latch 85 has an input from the multiplexer 80 and an enabling input 86. When the enabling input is asserted, the second enable latch 85 receives the instruction output by the multiplexer 80 and updates REG with this instruction. Likewise, when the enabling input 86 is not asserted, the second enable latch 85 holds its present instruction (i.e., the present instruction is held in REG).

The enabling input 86 for the second enable latch 85 is a NOT of localReg. Therefore, if localReg is asserted in a first cycle, the enabling input 86 will not be asserted, and the second enable latch 85 will retain its output and will not update REG in the next cycle. Referring to FIG. 7, in cycle 1, localReg is asserted. Therefore, the enabling input 86 is not asserted, the second enable latch 85 holds its present instruction C, and REG is not updated between cycle 1 and cycle 2 (the instruction in REG remains instruction C). By holding instruction C in REG between cycles 1 and 2, localReg overrides the global stall, since stallEx1 is not asserted in cycle 1. The global stall is disobeyed because the data read by instruction C from its source register during cycle 1 was incorrect, due to a local data-dependency hazard, as described above.

Since localReg is not asserted in cycle 2, the enabling input 86 is asserted and the second enable latch 85 is enabled. Accordingly, the second enable latch 85 outputs instruction D to REG between cycle 2 and cycle 3, as instruction D was the input from the multiplexer 80 (see above). Again, that localReg is not asserted indicates that the data read by instruction C from its source register in cycle 2 is correct and that it may be forwarded to the EX1 stage, as described above. By updating REG between cycles 2 and 3, the local pipeline again disobeys the global stall.

Figure 11:
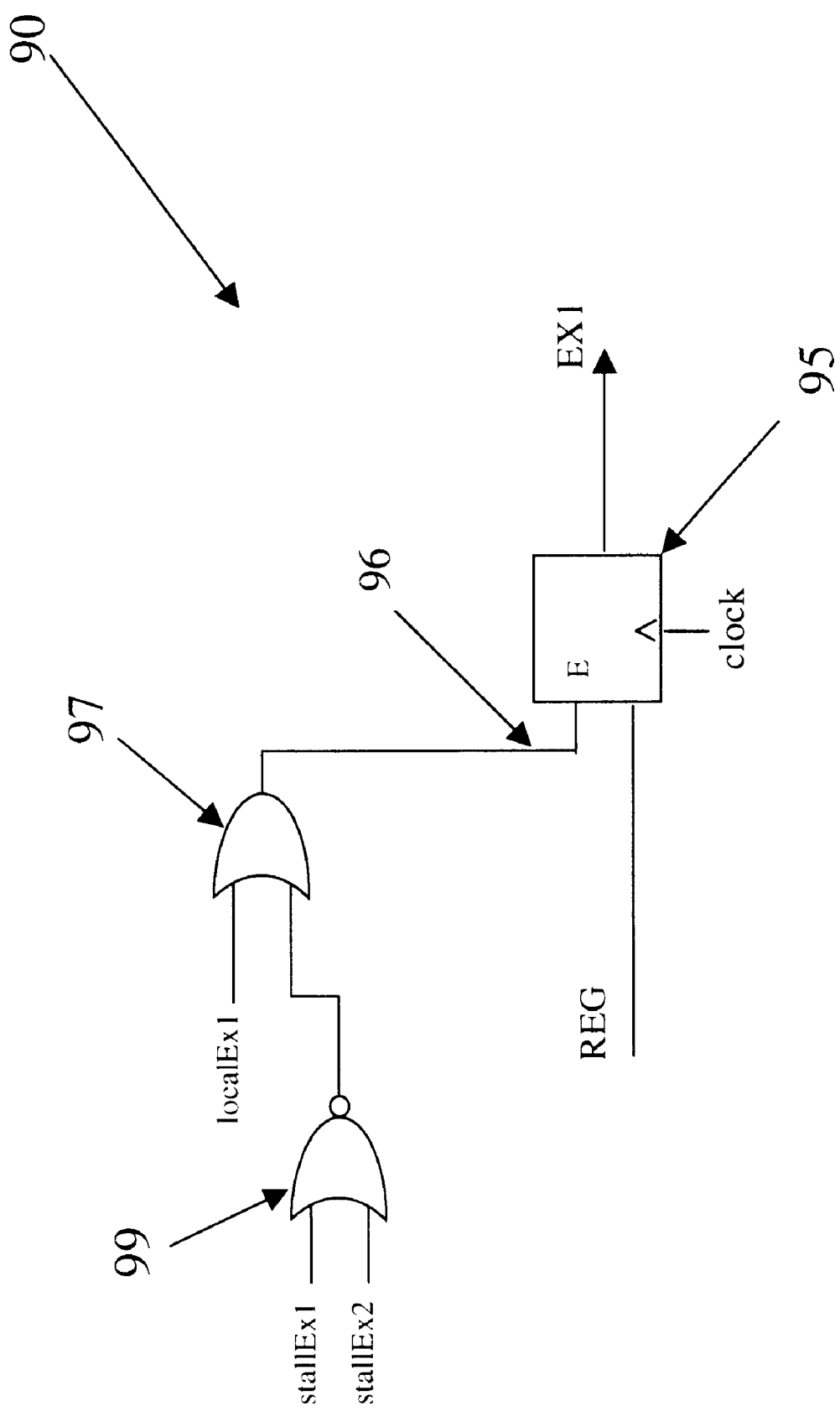
FIG. 11 is a logic circuit diagram of a second portion of the local pipeline.

A second portion 90 of an embodiment of a local pipeline 16 that performs according to the method described with reference to FIGS. 7–9, is illustrated by FIG. 11. FIG. 11 shows the REG stage to EX1 stage portion of the local pipeline 16. The second portion 90 has an enable latch 95 between the REG stage and the EX1 stage. If the enable latch 95 is enabled, the input from REG stage is output to the EX1 stage.

The enabling input 96 for the enable latch 95 is from an OR gate 97 of localEx1 and the output of a NOR gate 99 of stallEx1 and stallEx2. Accordingly, if either localEx1 is asserted or both stallEx1 and stall Ex2 are not asserted, then the enabling input 96 for the enable latch 95 will be asserted and the input from REG stage will be output to the EX1 stage. If localEx1 is asserted and stallEx1 is also asserted, the enable latch 95 acts as an override to the global stall. LocalEx1 causes the local pipeline 16 to "override" the global stall, as discussed above, since the local stall in EX1 signifies that new data is required. On the last cycle that localEx1 is asserted, localReg is not asserted, which signifies that the data is available and correct in REG, and the enable latch 95 updates EX1 with this data in REG. This is the situation that occurs on the transition between cycle 2 and cycle 3, as shown in FIG. 7, in which both localEx1 and stallEx1 are asserted. Instruction C is forwarded from REG to EX1 through the enable latch 95 in cycle 3, even though there is a global stall in cycle 2 and ordinarily the pipeline would hold instruction C in REG.

Accordingly, in a sense localReg can be thought of as an "incorrect data" signal while localEx1 can be thought of as an "override" signal. As soon as the data in REG is correct (localReg is de-asserted), EX1 is updated with this data and then holds this data (localEX1 is de-asserted). In essence, the data is "caught" when it finally becomes available, the updating is stopped right after catching the data, and then the data is held. By causing the global stall to be ignored and updating as soon as the data becomes available, therefore, the local stall is improving the performance of the local pipeline 16 by making it more efficient.

While the invention has been disclosed in this patent application by reference to the details of preferred embodiments of the invention, it is to be understood that the disclosure is intended in an illustrative rather than in a limiting sense, as it is contemplated that modifications will readily occur to those skilled in the art, within the spirit of the invention and the scope of the appended claims.

What we claim is:

1. A simplified data-dependency hazard detection comprising:

a first comparator, that determines if there is a data-dependency between at least one producer in a first stage of a pipeline and a first consumer in an earlier stage of the pipeline, wherein the first comparator comprises at least one output indicating whether there is a matched producer;

a first AND gate, that receives the output of the first comparator and a first pdna signal that indicates whether data is not available from the matched producer, wherein the first AND gate comprises an output that indicates that there is a local data-dependency hazard if the first comparator determines that there is a data-dependency between a producer in the first stage of the pipeline and the first consumer and the first pdna signal indicates matched producer data is not available.

2. The simplified data-dependency hazard detection of claim 1, further comprising:

a valid producer signal that indicates whether the matched producer is a valid producer.

3. The simplified data-dependency hazard detection of claim 1, wherein the first comparator determines if there is a match between a plurality of producers in a first stage of a plurality of pipelines and the first consumer in an earlier stage of a pipeline, the first comparator comprising a plurality of outputs.

4. The simplified data-dependency hazard detection of claim 1, further comprising:

a second comparator that determines if there is a data-dependency between at least one producer in a second stage of a pipeline and the first consumer in the earlier stage of the pipeline, wherein the second comparator comprises at least one output indicating whether there is a matched producer; and a second AND gate, that receives the output of the second comparator and a second pdna signal that indicates whether data is not available from the matched producer, wherein the second AND gate comprises an output that indicates that there is a local data-dependency hazard if the second comparator determines that there is a data-dependency between a producer in the second stage of the pipeline and the first consumer and the second pdna indicates matched producer data is not available.

5. The simplified data-dependency hazard detection of claim 4, further comprising:

an OR gate, that receives the outputs of the first and second AND gates, wherein the OR gate comprises an output that indicates a local stall should be generated if either the first AND gate output or the second AND gate output indicates that there is a local data-dependency hazard.

6. The simplified data-dependency hazard detection of claim 1, further comprising:
   a valid consumer signal that indicates whether the first consumer is a valid consumer.

7. The simplified data-dependency hazard detection of claim 6, further comprising:
   an OR gate, that receives the outputs of the first and second AND gates, wherein the OR gate comprises an output that indicates a local stall should be generated if either the first AND gate output or the second AND gate output indicates that there is a local data-dependency hazard; and
   a third AND gate, that receives the output of the OR gate and the valid consumer signal and outputs a local stall if the output of the OR gate indicates that a local stall should be generated and the valid consumer signal indicates that the first consumer is a valid consumer.

8. The simplified data-dependency hazard detection of claim 1, further comprising:
   a qualifying predicate signal that indicates whether the matched producer is predicated.

9. The simplified data-dependency hazard detection of claim 1, further comprising:
   a third comparator, that determines if there is a data-dependency between at least one producer in a third stage of a pipeline and a second consumer in the earlier stage of the pipeline, wherein the third comparator comprises at least one output indicating whether there is a matched producer.

10. A logic circuit for utilizing a local stall to improve performance of a pipeline, comprising:
    a recovery latch that receives an input from a first stage in the pipeline;
    a multiplexer that receives a first input from the first stage in the pipeline and a second input from the recovery latch; and
    a control input that determines whether the multiplexer output is the first input from the first stage or the second input from the recovery latch based on a first global stall signal and a second global stall signal.

11. The logic circuit of claim 10, wherein the control input is a NOT of a NOR gate that performs a logical NOR function of the first global stall signal and the second global stall function and wherein the multiplexer output is the second input from the recovery latch if the first global stall signal is asserted and/or the second global stall signal is asserted.

12. The logic circuit of claim 10, wherein the recovery latch is a first enable latch capable of holding a current value comprising:
    a first enabling input, that is produced by a logical NOR of the first global stall signal and the second global stall signal, whereby the recovery latch will hold its current value and not update with the input from the first stage if the first global stall signal and/or the second global stall signal are asserted.

13. The logic circuit of claim 10, further comprising:
    a second enable latch, capable of holding the multiplexer output or forwarding the multiplexer output to a second stage in the pipeline, comprising:
      a second enabling input, that is produced by a NOT of a local stall, whereby the second enable latch holds the multiplexer output if the local stall is asserted.

14. The logic circuit of claim 13, further comprising:
    a third enable latch, capable of holding an input from the second stage or forwarding the second stage input to a third stage in the pipeline, comprising:
      a third enabling input, that is produced by a logical OR of the local stall in the third stage and a logical NOR of the first global stall signal and the second global stall signal, whereby the third enable latch forwards the second stage input to the third stage if either the local stall in the third stage is asserted or if both the first global stall signal and the second global stall signal are not asserted.

15. A method for utilizing a local stall to improve performance of a pipeline, comprising the steps of:
    determining whether there is a local data-dependency;
    determining whether there is a local data-dependency hazard for a consumer data-dependent on a producer in an later stage of the pipeline;
    asserting a local stall based on a determination of a local data-dependency hazard;
    stalling the consumer in an earlier stage of the pipeline upon receipt of the local stall; and
    holding an instruction in a recovery latch prior to the earlier stage of the pipeline upon receipt of the local stall.

16. A method for utilizing a local stall to improve performance of a pipeline, comprising the steps of:
    determining whether there is a local data-dependency;
    determining whether there is a local data-dependency hazard for a consumer data-dependent on a producer in an later stage of the pipeline, wherein the determining step comprises the steps of:
      comparing the consumer's RegID to at least one producer's RegID in the later stage of the pipeline to find a matched producer; and
      characterizing the matched producer with a pdna signal which indicates whether the matched producer's data is not available and whether there is a local data-dependency hazard;
    asserting a local stall based on a determination of a local data-dependency hazard; and
    stalling the consumer in an earlier stage of the pipeline upon receipt of the local stall.

17. The method of claim 16, wherein the asserting step comprises the steps of:
    determining that the matched producer is a valid producer; and
    determining that the consumer is a valid consumer.

18. A method for utilizing a local stall to improve performance of a pipeline, comprising the steps of:
    determining whether there is a local data-dependency;
    determining whether there is a local data-dependency hazard for a consumer data-dependent on a producer in an later stage of the pipeline;
    asserting a local stall based on a determination of a local data-dependency hazard;
    stalling the consumer in an earlier stage of the pipeline upon receipt of the local stall;
    evaluating whether the local stall is still asserted; and
    forwarding the consumer to a later stage of the pipeline if the local stall is no longer asserted.

19. The method of claim 18, wherein the forwarding step comprises the step of:
    overriding an asserted global stall signal, wherein the global stall signal indicates that the consumer should be stalled in the earlier stage.

* * * * *